United States Patent [19]

Miller et al.

[11] 4,361,871
[45] Nov. 30, 1982

[54] FAILSAFE WHEEL SLIP CONTROL SYSTEM AND METHOD OF OPERATING SAME

[75] Inventors: Robert G. Miller, East Peoria; Weldon L. Phelps, Dunlap, both of Ill.

[73] Assignee: Caterpillar Tractor Co., Peoria, Ill.

[21] Appl. No.: 245,224

[22] PCT Filed: May 7, 1980

[86] PCT No.: PCT/US80/00539
§ 371 Date: May 7, 1980
§ 102(e) Date: May 7, 1980

[87] PCT Pub. No.: WO81/03152
PCT Pub. Date: Nov. 12, 1981

[51] Int. Cl.³ .......................... G06F 15/20; B60T 8/10
[52] U.S. Cl. .................................... 364/426; 180/197; 303/92
[58] Field of Search ........................ 364/426; 361/238; 303/92, 97, 98, 99, 107; 180/197; 74/711

[56] References Cited
U.S. PATENT DOCUMENTS

| | | | |
|---|---|---|---|
| 3,802,529 | 4/1974 | Burckhardt et al. | 180/197 |
| 3,825,306 | 7/1974 | Fink | 180/197 X |
| 3,871,249 | 3/1975 | Jeffers | 74/711 |
| 3,893,535 | 7/1975 | Burckhardt et al. | 180/197 |
| 3,941,203 | 3/1976 | Leconte | 180/197 |
| 4,066,300 | 1/1978 | Devlin | 364/426 X |
| 4,156,547 | 5/1979 | Marsh | 180/197 X |

*Primary Examiner*—Jerry Smith
*Attorney, Agent, or Firm*—Krass & Young

[57] ABSTRACT

A slip control system for vehicles having spaced apart drive wheels (200,202) driven by an input shaft (204) through a differential unit (206) including means (220) for calculating wheel slip according to the ratio of wheel speeds, means (220,230,232) for entering a slip control mode wherein a braking force is applied to the slipping wheel and incrementally varied on a periodic review basis according to recalculated slip values. If slip increases or holds steady, the brake force is incrementally increased. As slip becomes less, the brake force is incrementally reduced, the particular increments of force reduction being selected in accordance with successive measurements of slip. A drive shaft signal (226) is compared to the high wheel speed signal to identify a wheel speed transducer failure.

11 Claims, 6 Drawing Figures

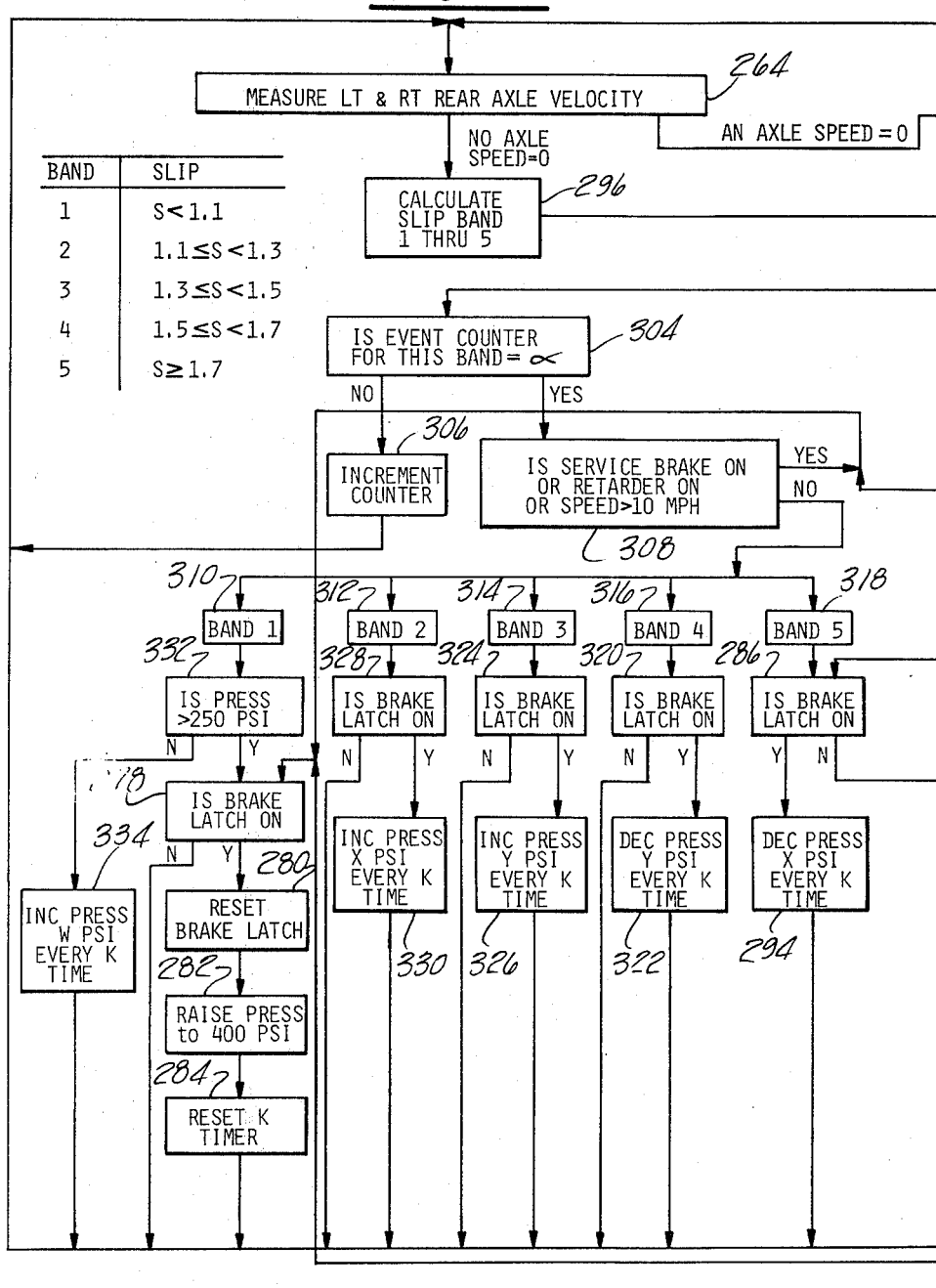

FAILSAFE WHEEL SLIP CONTROL SYSTEM AND METHOD OF OPERATING SAME

TECHNICAL FIELD

This invention relates to slip control systems for vehicles having differentially driven road wheels in which slip is controlled by application of a braking force to the spinning wheel, and more particularly, to a method and apparatus for detecting a wheel speed transducer failure by comparing the spinning wheel speed to the drive shaft speed.

BACKGROUND ART

It is well known that the standard vehicle having spaced apart drive wheels or wheel sets which are powered by a single engine through a differential drive experiences difficulties when one of the two differentially driven wheels loses traction. Conditions which give rise to a loss of traction exist commonly in construction sites and other off-road locations as well as on normal roads during wet, snowy or icy weather. A truck or automobile having one of two differentially driven wheels or wheel sets on ice and the other on ground providing good traction is often unable to move due to the fact that the action of the differential drive system directs all power to the wheel having no traction. The result is a slip condition wherein the wheel without traction rotates at twice its normal speed under given gear ratio specifications and the wheel with traction remains stationary.

To alleviate the slip or loss of traction condition, various mechanical anti-spin devices have been developed and put into commercial use. Such devices, however, can produce an abrupt transfer of all driving power to the wheel or wheel set having traction. This abrupt and full power transfer can create such mechanical stresses as to shorten the useful life of the drive train and/or cause catastrophic failure. In addition, mechanical anti-spin units often fail to accommodate the wheel speed differential which arises during normal turning of the vehicle and hence give rise to excessive tire wear due to drag effect.

An alternative approach to the slip problem due to loss of traction in differentially driven vehicles involves the provision of separately actuable drive wheel brakes whereby the operator can selectively apply a braking force to the spinning or slipping wheel thus to effect a balancing of power as between the slipping and nonslipping wheels; i.e., the application of the braking force to the slipping wheel simulates increased rolling resistance and results in a more even distribution of power as between the two differentially driven wheels. Systems of this type are common on farm vehicles but are not believed to be practical on large transport or off-road vehicles such as trucks and road graders.

More sophisticated approaches to slip control using the selectively actuable wheel brake systems are known in the prior art. These systems include speed sensors disposed on or adjacent each of the differentially driven wheels for generating speed signals, means for comparing the two signals to develop a slip signal and selectively operated solenoid means or solenoid operated valves to actuate either the left or right wheel brake when a slip condition is detected. One such system is disclosed in the U.S. Pat. No. 4,066,300 to Devlin issued Jan. 3, 1978. Another such system is disclosed in the U.S. Pat. No. 3,025,772 to Eger, Jr. et al. issued Mar. 20, 1962.

Neither the Devlin nor Eger, Jr. et al. system provides effective means for distinguishing between the signal resulting from a transducer failure and the signal resulting from a true slip condition wherein one wheel has lost traction. Both conditions include an indication that one wheel is stationary and the other is turning. Accordingly, automatic system actuation may occur when it is neither required nor advantageous to vehicle operation.

Another related prior art system is disclosed in the U.S. Pat. No. 3,871,249 to Jeffers, issued Mar. 18, 1975. In the Jeffers system, a mechanical locking device for a differential is equipped with a drive shaft speed sensor which inhibits lockup if shaft speed exceeds some predetermined amount. No means are provided for determining the relationship between shaft and wheel speeds. Hence Jeffers is not concerned with the problem of transducer failure and gives no teaching with respect to it.

The present invention is directed to overcoming the problems of the prior art and to provide an improved vehicle slip control system wherein slip is positively distinguished from transducer failure.

DISCLOSURE OF THE INVENTION

In one aspect of the invention an apparatus is provided for automatically balancing the power transfer between two differentially driven vehicle wheels when one of the wheels loses traction by applying a proportionally varying braking force to the wheel which loses traction during a slip control time period. Moreover, the system includes means whereby a true slip condition is positively distinguished from a broken or failed wheel speed transducer condition. This system comprises known wheel speed transducers for generating wheel speed signals and, in addition, a third transducer is associated with the drive shaft, or a component rotating in unison therewith, to generate an input speed signal. Means are further provided for comparing the input speed with the spinning wheel speed and for entering a slip control mode only if the ratio of wheel to input speeds exceeds a predetermined value.

In another aspect of the invention, a method is provided for achieving improved operation of an anti-slip system for vehicles having wheels or wheel sets driven through a differential unit by an input shaft wherein a failure of one wheel speed transducer is positively distinguished from a true slip condition. This is achieved by comparing the speed of the spinning wheel to the speed of the input shaft and entering a slip control mode only when the speed ratio exceeds a predetermined value.

BRIEF DESCRIPTION OF DRAWINGS

FIG. 4 which comprises FIGS. 4A and 4B is an operational flow chart from which programming for the microprocessor in the embodiment of FIG. 2 may be readily developed.

BEST MODE FOR CARRYING OUT THE INVENTION

Figure 1:
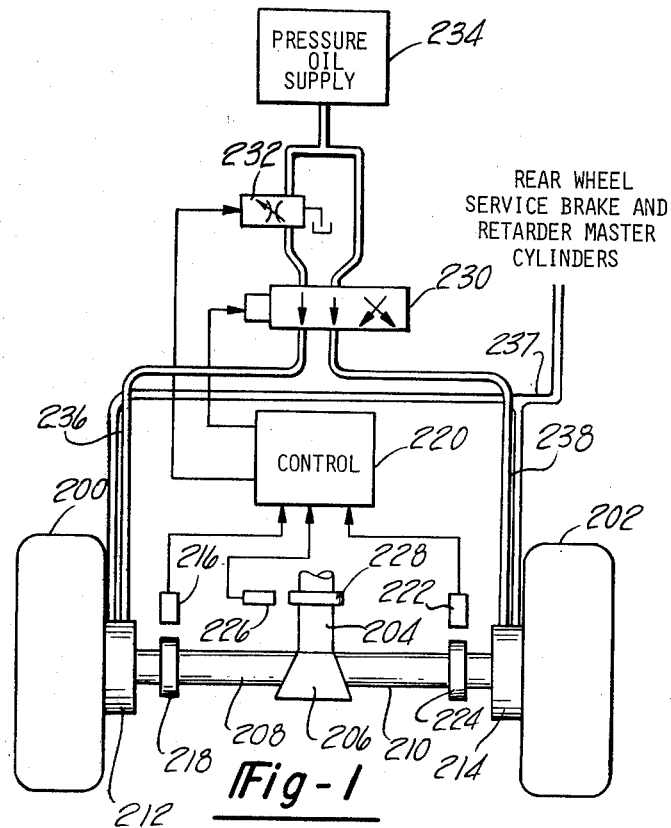
FIG. 1 is a schematic diagram of a vehicle drive system embodying an anti-slip control system in accordance with the invention.

FIG. 1 illustrates an embodiment of the invention as applied to the detection and control of slip due to loss of traction in a vehicle having road wheels 200 and 202 driven by a single engine (not shown) through an input or drive shaft 204, a differential unit 206 and half-axles 208 and 210 respectively. The drive system is per se conventional and no details beyond these need be given for an understanding of the invention.

Wheels 200, 202 are stopped by spring engaged emergency/parking brake pistons or hydraulically engaged service brake pistons of brakes 212, 214. The brakes are spring biased so that when no hydraulic pressure is present, the emergency/parking brakes engage and stop the wheels. During operation of the vehicle the brakes are maintained in the disengaged position by fluid pressure as disclosed in U.S. Pat. No. 3,927,737 issued Dec. 23, 1975 to P. F. M. Prillinger and assigned to the assignee of this invention. The brakes are normally actuated via a service brake line 237 coming from the rear wheel service brake and retarder master cylinders (now shown). The service braking system, per se, is well known and does not form part of this invention. The brakes are also actuated through the parking/emergency brake lines 236, 238 as described in detail below.

The slip control system comprises a left wheel speed pickup in the form of an electromagnetic transducer 216 which operates to provide pulses in cooperation with a gear-like device 218 which is mounted in the housing for axle 208 so as to be rotated with said axle. Signals from pickup 216 are applied to one input of an electronic controller 220, the details of which are hereinafter described. The right wheel speed signals provided by means of a pickup 222 operate in conjunction with a gear-like device 224 which rotates with the axle 210. The right wheel speed signal is applied to another input of electronic controller 220. Finally, a drive shaft speed signal is generated by pickup 226 and gear-like device 228 which rotates with the drive shaft 204. The drive shaft speed signals are applied to a third input of electronic controller 220.

All of the transducers 216, 222 and 226 are preferably electromagnetic type devices for measuring a change in magnetic reluctance due to a varying air gap between the pickup pole and a rotating ferrous disk or gear. Such devices produce a time varying output voltage which is easily amplified and shaped into square pulses or spikes in a known manner. However, other known transducers, such as optical and hall effect devices may be employed as alternatives.

Controller 220 operates upon the three signal inputs to determine the existence, magnitude and location of wheel slip during a loss of traction situation, and to distinguish between wheel slip and a transducer failure. If a true slip condition is indicated, the power transfer between the two differentially driven vehicle wheels 200 and 202 is balanced by applying a proportional braking force to the wheel which loses traction. This is accomplished by means of location selection valve 230 and proportioning valve 232, both of which are connected to receive output signals from the controller 220.

The valves 230 and 232 operate in combination with a supply 234 of oil or brake fluid under pressure, the fluid lines from supply 234 running both through the proportioning valve 232 and around the proportioning valve to the 4-way solenoid operated valve 230 which directs full pressure to one of the parking brakes 212, 214, and modulated or proportionally controlled fluid pressure to the other. In this instance brake pressure is applied by relieving fluid pressure in one or the other of the two brake lines 236 and 238. This is a consequence of the selection of spring biased brakes 212, 214 and could be straightforwardly implemented in the reverse fashion, i.e., brake pressure might be increased in direct rather than inverse ratio to the applied fluid pressure.

Figure 2:
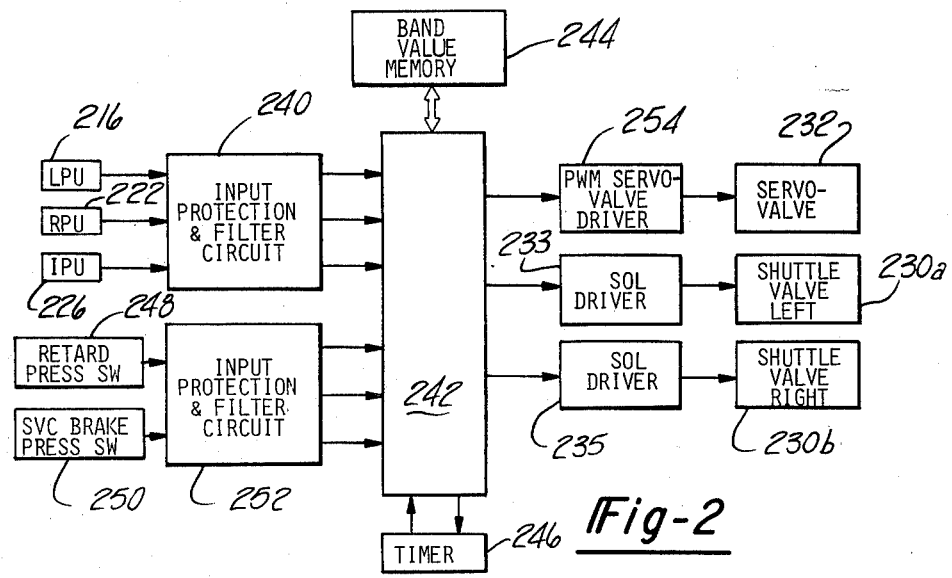
FIG. 2 is a block diagram of a wheel slip control system in accordance with the invention and comprising a microprocessor to perform mathematical calculations and comparisons.

FIG. 2 illustrates the preferred implementation of the electronic controller 220 of FIG. 1. In this implementation a solid state digital microprocessor 242 of the type available from such sources as Motorola and Fairchild is utilized to perform system control functions; most notably, to compare the speed of the spinning wheel to the speed of the input shaft 204 and to enter the slip control made only if the speed ratio matches or exceeds a given value. Microprocessor 242 also is programmed to establish a plurality of slip value bands, each band having defined slip signal values and each band having associated therewith an applied brake force value expressed in terms of fluid pressure. The microprocessor is readily programmed to respond to signals from the left, right and drive shaft pickups 216, 222 and 226, respectively, to generate a slip signal and to compare the slip signal to the limits of each of the bands, thereby to determine the particular band within which the slip signal resides in any given time. To this end microprocessor 242 is operatively interconnected with a band value memory 244 and a timer 246 which establishes a timing cycle hereinafter described. Pickups 216, 222 and 226 are connected through an input protection circuit and noise filter circuit which provides appropriately digitized input signals to the microprocessor 242. A retard brake pressure switch 248 and a service brake pressure switch 250 are connected through input protection and noise filter circuit block 252 to the microprocessor 242 for resetting the anti-spin control to OFF when the service brakes or retarder are actuated, much the same as an automobile cruise control is reset OFF when the service brakes are applied. This feature gives the vehicle operator uncontested control of the braking function when he is using the service brakes.

Completing the description of the block diagram of the system as shown in FIG. 2, microprocessor 242 has three illustrated outputs, the first output going through a pulse width modulated servo valve driver 254 to the servo operated proportioning valve 232. The second output goes to the solenoid driver 234 associated with the left direction shuttle valve 230a and the third output goes through solenoid driver 236 to the right direction shuttle valve 230b. It will be appreciated that the outputs to the solenoids 230a and 230b are represented in FIG. 1 as a single line for purposes of simplicity.

Figure 3:
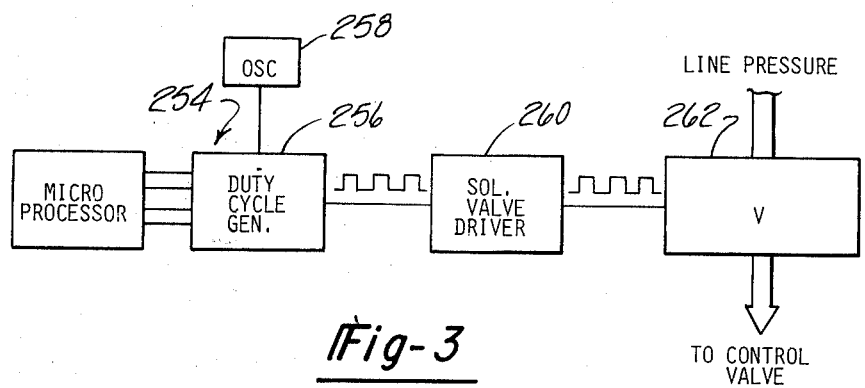
FIG. 3 is a more detailed block diagram of a portion of the overall system of FIG. 2.

FIG. 3 illustrates a preferred implementation of the pulse width modulated servo valve driver 254 in greater detail. The pulse width modulation servo valve driver 254 comprises a duty cycle generator 256 in the form of a digital to pulse width converter, such as Motorola integrated circuit number 6840. An oscillator 258 is connected to the duty cycle generator 256 to provide a base frequency. The output of the duty cycle generator is a width modulated pulse train at a frequency of 100

Hz and this signal is applied to an amplifier 260 which increases the amplitude of the signal as shown. The signal is applied to a proportioning valve 262, such as the proportional controller model number 82 which is available from the Fema Corporation of Portage, Mich. The proportional controller is in turn connected to the control valve 232 in a manner well known to those skilled in the art to vent the pressure from supply 234 and thereby modulate the brake fluid pressure in whichever of the lines 236 and 238 is selected by valve 230.

Figure 4B:
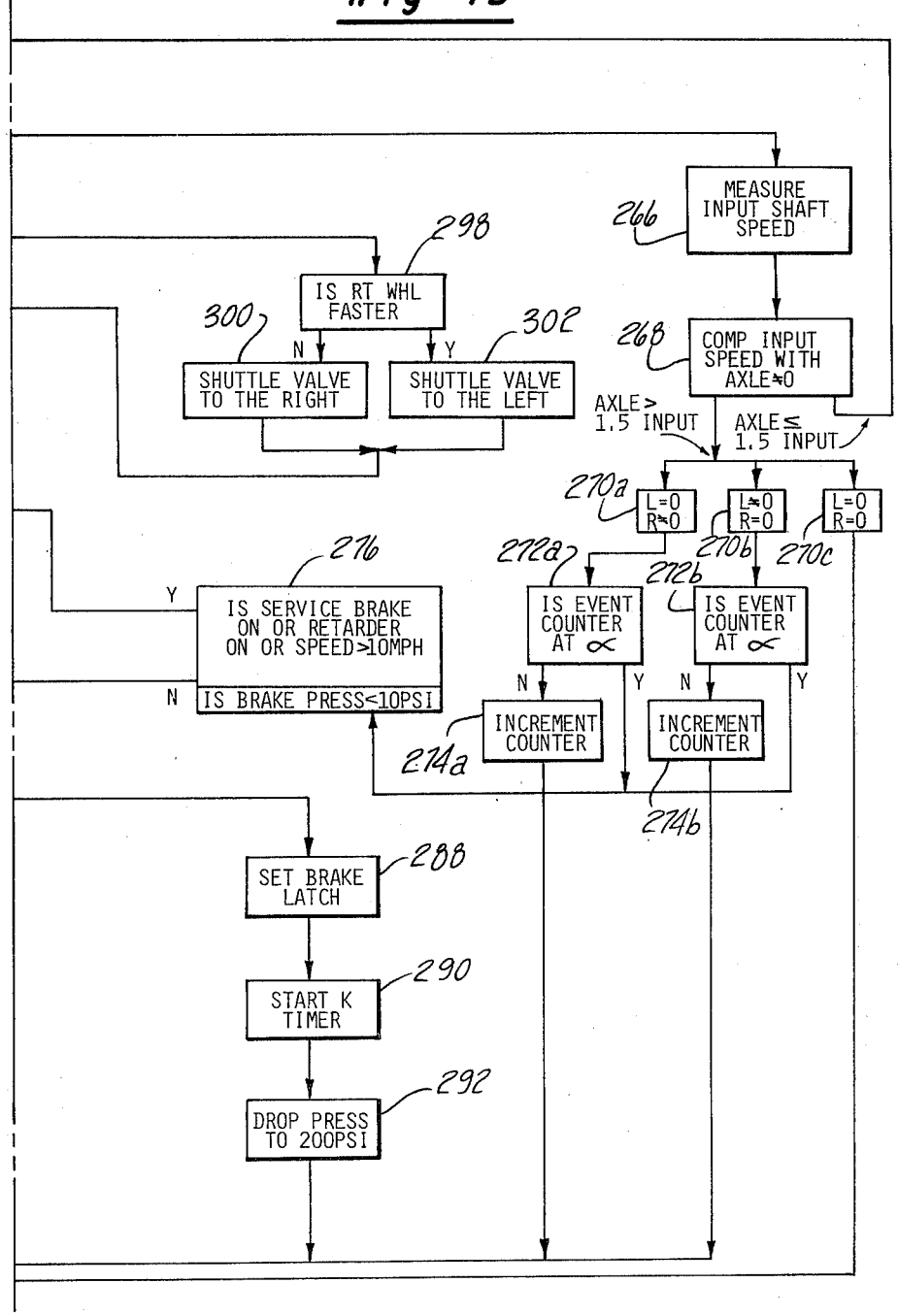

Referring now to FIG. 4, a flow chart defining the internal programming for the microprocessor 242 and associated memory 244 is shown. From this flow chart a programmer of ordinary skill can develop a specific set of instructions for a general purpose microprocessor so as to define the necessary slip signal value bands, timing cycles, and brake fluid pressure values which are essential to the full implementation of the invention as hereinafter described. It will be appreciated that while the best mode of the invention comprises the properly programmed microprocessor, the programming of which is disclosed in FIG. 4 and the result of which is the creation of novel hardware associations within the microprocessor and its associated devices, it is possible to implement the invention utilizing more traditional hardwired circuits including comparators, summers and gates. For example, slip signal values may be generated by means of tachometer generators and voltage comparators and the result applied to a series of biased comparator amplifiers representing a series of contiguous slip value bands. The outputs of the amplifiers may be summed through conventional logic and applied to a stepper motor, ladder network or other summing device operatively interconnected with the proportioning valve.

INDUSTRIAL APPLICABILITY

Figure 5:
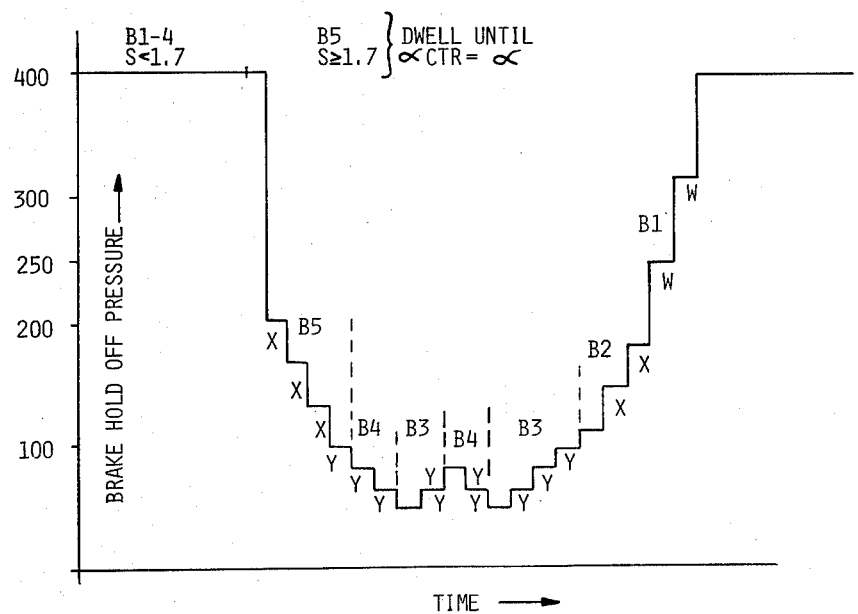
FIG. 5 is a chart of a brake hold off pressure versus time and is utilized in describing the operation of the embodiment of FIG. 2.

Referring now to FIGS. 1, 4 and 5, an example of industrial applicability will be described with reference to the operation of a vehicle having differentially driven wheels 200 and 202, a drive shaft 204 and a differential unit 206 through which the wheels 200 and 202 receive power from a single engine. It is further assumed that the vehicle on which the wheels 200 and 202 are mounted has a turning capability which, when employed to full effect, results in a maximum wheel speed differential of 1.5.

By way of preliminary summary, the operation of the embodiment of FIGS. 1 and 2, when programmed in accordance with the flow chart of FIG. 4, involves the definition and storage of five speed differential or slip bands and the further definition of braking forces, expressed in brake fluid pressure increments, associated with a speed differential value for each band. In addition, a relatively high slip value threshold is set for entering into the slip control mode while a relatively low slip threshold value is established for exiting from the slip control mode. In addition, a timing period is established whereby the slip value is periodically redetermined and, to the extent it remains within a given band, a brake pressure increment, either positive or negative, is effected at the end of each clock time until the slip value moves to another band. Finally, an indication of slip is always cross-checked by comparing the speed of the spinning wheel to the speed of the drive shaft 204 so that the functional failure of one wheel speed pickup is not misinterpreted as a slip condition. This latter function derives from the phenomenon of differential drives wherein a 100% slip condition results in a ratio of slipping wheel speed to drive shaft speed which is double the normal ratio existing under non-slip, non-turning conditions. Assuming a 1:1 rear axle ratio, this can be simplified by saying that a 100% slip condition exists when the slipping wheel speed is twice the drive shaft speed.

Having briefly summarized the functional characteristics of the properly programmed system a full description of operation will now be given.

Flow chart block 264 (FIG. 4) represents the sampling of data from the left and right speed signal pickups 216 and 222; it will be appreciated that such data is placed in given address locations by the microprocessor so that it is available for later retrieval and processing for calculation purposes. As a first condition it is assumed that one of the axle speed signals is equal to zero. If this is the case the routine progresses along the right side of the flow diagram in FIG. 4. Block 266 represents input of the drive shaft speed signal from pickup 226, it being understood that this signal is also placed in a predetermined storage location by the microprocessor. The input or drive shaft speed signal is compared in block 268 with the non-zero wheel speed signal and if the ratio of the wheel speed to drive shaft speed is equal to or less than 1.5 it is assumed that the wheel showing zero speed is actually turning and the zero indication is the result of a pickup failure. The program then calls for a return to the original input point; in addition it may be desirable to set an output signal condition which alerts the operator to the apparent transducer failure.

If the rotating wheel speed is greater than 1.5 times the drive shaft speed, as indicated by comparison steps 268, the program progresses to the evaluative step represented by flow chart blocks 270a, 270b and 270c. If the condition represented by block 270a is satisfied the program progresses to block 272a which is an event counter requiring several successive cycles of positive signal conditions before the "brake latch" condition, i.e., the activation of the slip control system is begun. It has been found that such a delay is advisable from the standpoint of efficient system operation so as to filter out short term aberrations in wheel speed condition. If the event counter has not reached the delay time $a$ the program progresses to block 274a which involves incrementing the counter. From this point the program returns to the original input condition.

If the condition represented by program block 270b is satisfied the program progresses to blocks 272b and 274b in the manner previously described. If either block 272a or 272b produces a positive signal condition the program progresses to block 276 which involves a determination of the input signal switch conditions controlling the service brake, the retarder and/or the vehicle speed. In addition, it may be advisable to check brake pressure.

If the speed signal condition represented by block 270c is satisfied the program advances to blocks 278, 280, 282 and 284 to release the parking brakes 212 and 214 and reset the timer. The same result occurs if the output of program block 276 is positive.

If the output of program 276 is negative the program progresses to block 286 to determine whether the slip control system is activated. If the result is positive the effect is the same as entering band 5, i.e., the most severe slip condition band and progressing to block 294 which increases the wheel brake force by decreasing the wheel brake hold-off pressure by the pressure increment x for every timed interval established by the microprocessor timer. If program block 286 indicates that the slip control system is not operative the program progresses to block 288 which activates the system and thence through blocks 290 and 292 to begin the timing cycle and reduce the brake hold off pressure to a value just sufficient to maintain the brakes in the off position. On the next pass through the above sequence, a positive result will be obtained at block 286 and in block 294 brake hold off pressure will be decremented x psi. The control will continue to repeat this sequence at timed intervals until either the zero speed wheel starts to turn or else the brake hold off pressure is decremented to nearly zero psi (<10 psi). In the latter case, the brakes are then released completely. In the former case, the control follows the path from block 264 to block 296 and beyond as described in the following paragraphs.

Assuming the result of calculation block 264 indicates that neither wheels 200 nor 202 is stopped; i.e., the vehicle is moving, the program branches to block 296 representing a calculation subroutine. In essence, the calculation subroutine involves determining the location of the actual slip value within each of five bands represented by the small table shown to the upper left side of FIG. 4. Note that the slip bands are contiguous, i.e., the upper limit of one band is the lower limit of the next band and that the highest slip value which is required for activation is 1.7.

Program blocks 298, 300 and 302 represent the determinations of which wheel is the faster rotating wheel and the proper disposition of the shuttle valve 230 so as to direct modulated brake pressure to the highest speed wheel and unmodulated brake pressure to the lower speed wheel. The program then advances to block 304 to determine whether or not a sufficient slip time period has elapsed to begin operation of the system. If insufficient time has elapsed program block 306 simply increments the counter and begins the process over again. If sufficient time has elapsed the program advances to block 308 which scans the various signal conditions which might disqualify the vehicle for operation of the slip control system. If, however, the vehicle qualifies for slip control the program advances to a selected one of the bands 310, 312, 314, 316 and 318. Assuming that a slip condition is first determined and that the time $\alpha$ has elapsed, the vehicle can only enter the slip control mode via band 5; the ratio of the high speed wheel rate to the low speed wheel rate must be 1.7 or greater. However, as hereinafter described, the vehicle can exit the control mode by sequencing through the lower bands 4 through 1 so as to produce a smooth transition back to the uncontrolled mode.

Assuming the vehicle enters band 5 through program block 318 and that a positive indication is reached in the next program block 286 the brake force is periodically incremented upwardly by reducing the brake pressure as indicated in program block 294 by the increment X(psi) for every timing cycle until the slip value qualifies the program for entry into another band. This is indicated in FIG. 5 where the first step from the hold off pressure of 400 psi represents an abrupt drop to 200 psi and three additional incremental drops of approximately 33 psi so as to increase the parking brake force through spring action with each increment.

After the first large pressure drop and the three incremental pressure drops the slip condition in the example represented by FIG. 5 is shown to enter band 4; i.e., the slip has been reduced to the point where the value is between 1.5 and 1.7. In this condition program blocks 320 and 322 cause the brake force to be increased by a smaller increment Y (psi) for every timing cycle. Accordingly, the system approaches the full brake force condition in a gradual curve where the increments become smaller toward the full brake force condition.

As is also represented in FIG. 5, reaching the lower slip values so as to qualify for successive entry into bands 3, 2 and 1, causes gradually increasing incremental reductions in brake force until the system is back to the uncontrolled condition represented by the full brake pressure condition of 400 psi. To this end band 3 is the mirror image of band 4 and causes incremental reductions in brake force through incremental increases in brake pressure; band 2 is the mirror image of band 5 in causing large (X) incremental reductions in brake force. Band 1 has no counterpart and causes fairly large reductions in brake force as represented by the increment W in the example diagram of FIG. 5.

From the foregoing it is apparent that the slip control system operates to detect slip, to apply a braking force to the slipping wheel and to periodically and incrementally modulate the brake force either positively or negatively in accordance with the degree of slip which is detected by the system. The use of a drive shaft speed signal provides a failsafe condition wherein a false zero speed indication from one of the wheel speed transducers is immediately recognized and the slip control system appropriately disabled. Vehicle turning conditions giving rise to a slip indication of 1.5 or less but with both wheels turning, do not cause entry into the slip control modes since the conditions necessary for band 5 entry are not satisfied. On the other hand, once the slip control mode has been entered via band 5, a new slip threshold is established such that the system can exit from the slip control mode through at least three incremental steps represented by bands 3, 2, and 1.

It will be appreciated by those skilled in the art that is it not essential to incorporate all of the steps represented in the flow chart of FIG. 4 in a given system, nor is it necessary to utilize a microprocessor. However, such an implementation is deemed to be the best mode of implementing the invention due to the broad and widespread commercial availability of suitable microprocessor circuits, the widespread understanding of programming techniques for such microprocessors, the cost reduction in such integrated circuitry which has been realized in recent years, and the flexibility which a programmable device affords.

Other aspects, objects and advantages of this invention can be obtained from a study of the drawings, and disclosure and the appended claims.

We claim:

1. In a system for balancing the power transfer between two vehicle wheels (200,202) which are driven by a common input shaft (204) through a differential unit (206) when one of said wheels loses traction, said system being of the type which includes means (216,222) for generating wheel speed signals, control means (220) for developing a slip signal related to the difference between said wheel speed signals, and means (212,214) operated by said control means (220) for applying a braking force to the wheel which loses traction, the improvement comprising:

means (226) for generating a signal representing input shaft speed, said control means (220) including means (242) for comparing wheel and input shaft speeds and preventing actuation of the braking means (212,214) for slip control purposes until the ratio of the speed of the wheel which loses traction to the speed of the input shaft exceeds a predetermined value.

2. Apparatus as defined in claim 1, wherein the control means (220) further comprises
means (244) for defining a plurality of slip signal value bands each having defined slip value limits, and
means (230, 232, 234, 256) for incrementally changing the braking force in accordance with the band within which the current slip value falls.

3. Apparatus as defined in claim 2 wherein the defining means (244) further defines both positive and negative incremental changes, each change being associated with a given slip value band and the negative brake force incremental changes being associated with lower slip value bands.

4. Apparatus as defined in claim 2 wherein the means (230, 232, 234, 256) comprises a source (234) of brake fluid pressure and signal responsive means (232) connected to said means (242) and responsive to outputs therefrom for varying the brake fluid pressure applied to said wheels.

5. Apparatus as defined in claim 4 wherein the means (230, 232, 234, 256) further comprises wheel selection means (230) responsive to outputs from said means (242) to vary the brake fluid pressure to only one of said wheels.

6. Apparatus as defined in claim 2 wherein said means (242) comprises timer means (246) for cyclically recalculating the slip signal value.

7. Apparatus as defined in claim 2 wherein the means (230, 232, 234, 256) further comprises a duty cycle generator (256) connected to receive outputs from the control means (220), and means (260 and 262) responsive to the output of the duty cycle generator for varying the brake fluid pressure applied to the other of said wheels under slip conditions.

8. Apparatus as defined in claim 1 wherein the predetermined value is substantially 1.5.

9. A method for balancing the application of power to two vehicle wheels (200,202) which are driven by a common input shaft (204) through a differential unit (206) when one of said wheels loses traction and for screening out false indications of traction loss comprising the steps of:
developing first and second signals representing the speeds of the differentially driven wheels;
developing a third signal representing slip as a function of the difference between the first and second signals;
developing a fourth signal representing input shaft speed;
comparing the input shaft speed signal to the larger of the wheel speed signals; and
applying a brake force to the higher speed wheel only when the ratio of the wheel to shaft speeds exceeds a predetermined value.

10. A method as defined in claim 9 wherein the value is at least 1.5.

11. A method of preventing spurious operation of a selected-brake type wheel slip control system due to wheel speed transducer failure comprising the steps of:
determining the presence of a slip condition by comparing wheel speed transducer signals from two differentially driven wheels,
comparing the speed of the faster rotating wheel to the speed of a differential input element such as a drive shaft; and
acting to control slip through selective brake application only if the ratio of the faster wheel speed to the differential input speed exceeds a predetermined value.

* * * * *

UNITED STATES PATENT AND TRADEMARK OFFICE
CERTIFICATE OF CORRECTION

PATENT NO. : 4,361,871

DATED : November, 30, 1982

INVENTOR(S) : Robert G. Miller et al.

It is certified that error appears in the above-identified patent and that said Letters Patent is hereby corrected as shown below:

Column 1, line 59, "actuable" should be --actuatable--.

Column 4, line 54, numeral "234" should be --233--.

Column 4, line 56, numeral "236" should be --235--.

Column 8, lines 38 and 39, "is it" should read --it is--.

Claim 7, lines 6 and 7, delete "other of said wheels under slip conditions." and insert --wheel which has lost traction.--

Signed and Sealed this

Fourteenth Day of February, 1989

Attest:

DONALD J. QUIGG

Attesting Officer

Commissioner of Patents and Trademarks